2,768,108
Patented Oct. 23, 1956

2,768,108

OPTICAL LENS MAKING

Edward Carnall, Jr., and John J. Lugert, Rochester, N. Y., assignors to Eastman Kodak Company, Rochester, N. Y., a corporation of New Jersey No Drawing. Application February 19, 1954, Serial No. 411,556

4 Claims. (Cl. 154—128)

This invention relates to optical lens making, optical components utilizing the cements, and a method of making optical components particularly adapted for utilizing the new cements.

In cementing together lens elements it is desirable to use a cement which is clear, has high adhesive strength and durability characteristics, has a desirable degree of elasticity, has low shrinkage, and is stable over a long period of time. The cement should also be substantially immune to the effects of variations in temperature during use of optical components utilizing the cement, and this is particularly essential and difficult to obtain to a sufficient degree in the case of optical instruments intended for aircraft use, where temperatures may range from $-100°$ F. to $300°$ F. Drastic humidity conditions must also be withstood, and a good test of this quality of a cement is exposure to 95% relative humidity at $130°$ F. for periods over 1000 hours.

It is common practice to use thermosetting organic adhesive as optical cements, but it is difficult to find adhesives which will meet the high and low temperatures and high humidity conditions required of modern optical equipment without having the cement craze, crack, or breakdown in such ways as to destroy or impair the utility of the optical components. With the cements of the present invention it is possible to make multi-element lenses which will withstand these conditions, and permit the evaporation of a low reflection coating on the surfaces of the cemented optics at temperatures of about $300°$ F. at a vacuum of $10^{-4}$ mm. without any darkening, decomposition, or depolymerization of the cemented layer. These cements are unique in their combinations of the above properties which make them suitable for use in any kind of optical equipment.

An object of this invention is to provide an optical cement which is stable, clear, relatively colorless, and which is useful at low temperatures such as those encountered at high altitudes as well as at comparatively high temperatures and humid conditions such as are found in the tropics. Another object of this invention is to provide a cement which will permit the coating of lenses after the cementing operation with a low reflection coating. A further object of this invention is to provide a cement having an index of refraction near the average square root of the most commonly used optical glasses in the industry. Other objects of this invention are to provide a cement with a minimum of vapor pressure, shrinkage factor and coldflow.

These objects are attained by applying to the surfaces of the elements of the optical component a polymerizable composition which is comprised of (1) at least 45% of a di-beta, gamma unsaturated alkenyl arylphosphonate, (2) at least 15% by weight of a compatible, polymerizable, unsaturated polyester derived from bicyclo (2,2,1)-5 heptene-2, 3-dicarboxylic anhydride and a 1,2-dihydric alcohol and (3) a catalyst for accelerating the copolymerization of components (1) and (2). The cement layer is worked free of bubbles and voids and the elements adjusted and held in their proper position in some convenient manner. The cemented lens is then polymerized in an oven at an appropriate temperature.

The following examples illustrate but do not limit our invention:

PREPARATION OF RESIN I

One mole of 1,2-propanediol and one mole of bicyclo (2,2,1)-5-heptene-2,3-dicarboxylic anhydride and 0.01% hydroquinone are heated at $205°$–$210°$ C. under an inert atmosphere of nitrogen or carbon dioxide or the like. The reaction is carried out for 9–12 hours until the acid number of the polyester is between 14 and 17.

Example I

A suitable optical cement is prepared by mixing 55 parts of polyester (Resin I) derived from 1, 2-propanediol and bicyclo (2,2,1)-5-heptene-2, 3-dicarboxylic anhydride which is stabilized with 0.01% hydroquinone, and 45 parts by weight of diallyl benzene phosphonate. For use, about 3% by weight of benzoyl peroxide is blended with 100 parts of the composition to form a uniform composition which is applied to the surfaces of the optical elements to be cemented. The elements are then adjusted and held in their proper position by conventional means until the cement between the components is polymerized. To polymerize the cement between the optical elements the component is placed in an oven at about $70°$ C. for sufficient time to accomplish polymerization. The optical component so produced is not affected by temperatures down to $-100°$ F. or temperatures up to $400°$ F. The bond between the glass surfaces was not affected by 95% relative humidity at $130°$ F. for a period of over 1000 hours. After cementing with this material lenses have been given a nonreflective coating applied at a temperature of about $270°$ F. under reduced pressure of about $10^{-4}$ mm. The coating so produced was hard and withstood a 100-hour salt spray test without deterioration.

Example II

An optical cement composed of 40 parts of a polyester derived from bicyclo (2,2,1)-5-heptene-2, 3-dicarboxylic anhydride and 1, 2-butanediol, containing 0.01% hydroquinone, and 60 parts of diallyl toluenephosphonate are blended together. For use, about 3% by weight tertiary butyl perbenzoate is added to 100 parts of the composition, which is stirred until the accelerator is fully dispersed. The composition is then used to join together the elements of the optical element. The lens is then heated at $80°$ C. for about 16 hours or until such time that polymerization is effected. The cemented lens has good clarity and is free from voids or bubbles in the adhesive layer. The adhesive is resistant to temperature changes in the same way as the optical components produced according to Example I.

Example III 45 parts of a polyester derived from bicyclo (2,2,1)-5-heptene-2, 3-dicarboxylic anhydride and 1, 2-ethanediol, containing 0.01% hydroquinone and 55 parts of diallyl cholorobenzene phosphonate are blended together. For use, about 3% by weight of benzoyl peroxide is added to 100 parts of the composition and the accelerator is stirred in until dissolved. The resulting composition is used as an adhesive in the manner described in Examples I and II. The adhesive is resistant to temperature changes in the same way as the optical components produced according to Examples I and II.

Other suitable phosphonate esters are: bis (methylallyl) benzene-phosphonate, bis (methylallyl) toluenephosphonate, dicrotyl benzenephosphonate, and the like. Other suitable polymerization catalysts are: acetyl peroxide, phthallic peroxide, lauric peroxide, etc.

We believe the stability over such a large temperature range is due to the nature of the polyester. Apparently the unsaturated linkage in the nucleus of bicyclo (2,2,1)-5-heptene-2, 3-dicarboxylic anhydride is sufficiently reactive that it copolymerizes with the phosphonate ester. This means that the polyester behaves as an internal plasticizer and since it is internally linked it has the advantage of not suffering from migration or evaporation at elevated temperatures.

The cements which are produced according to our inventions are useful for cementing optical components in every field of optics, including telescopes, microscopes, cameras, projectors, and similar apparatus.

These cements have low shrinkages on polymerization, that resist high and low temperatures, that resist humid conditions, and that permit the coating of lenses after the cementing operation.

We claim:

1. An optical component composed of at least two elements having facing optical glass surfaces, and a cement comprising a polymerization composition made up of a diallyl phenyl phosphonate and a polyester derived from bicyclo (2,2,1)-5-heptene-2, 3-dicarboxylic anhydride and a dihydric alcohol between and in contact with the facing optical glass surfaces of said elements.

2. A method of making an optical component having at least two elements provided with optical glass surfaces, comprising assembling said elements with a cement comprising a di-beta, gamma unsaturated alkenyl arylphosphonate, a polyester formed from bicyclo (2,2,1)-5-heptene-2, 3-dicarboxylic anhydride, a lower alkenyl 1,2-dihydric alcohol and a polymerization catalyst, said cement being positioned between and in contact with said surfaces, and then heating the assembly to polymerize the cement.

3. A method according to claim 2 in which the heating is carried out at about 70° C. for about 16 hours.

4. A method according to claim 3 wherein the cemented elements are placed in an aligning fixture before polymerization of the cement, and the cement is polymerized by heating while said elements are in said fixture.

References Cited in the file of this patent

UNITED STATES PATENTS

| | | |
|---|---|---|
| 2,453,666 | Kropa | Nov. 9, 1948 |
| 2,586,885 | Fon Toy et al. | Feb. 26, 1952 |
| 2,646,416 | Parker | July 21, 1953 |

OTHER REFERENCES

Wakeman: Chemistry of Commercial Plastics, cpw. 1947, Rheinhold Publg. Corp., N. Y. C., page 248 (bottom).